Figure 1:
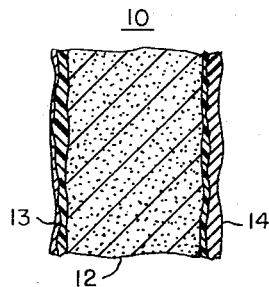

INVENTOR,
JON W. ZIMMER.

3,297,482
CARBON ELECTRODE WITH POLYTETRAFLUOROETHYLENE ON ONE SIDE AND PLATINIUM ON THE OTHER SIDE, FUEL CELL WITH SAME AND ELECTRODEPOSITING METHOD OF PREPARING SAME
Jon W. Zimmer, Chicago, Ill., assignor to the United States of America as represented by the Secretary of the Army
Filed Oct. 4, 1963, Ser. No. 314,072
5 Claims. (Cl. 136—86)

The invention described herein may be manufactured and used by or for the Government for governmental purposes without the payment of any royalty thereon.

This invention relates to the method of preparing a carbon electrode for use in a fuel cell using an acid electrolyte, to a carbon electrode so prepared, and to a fuel cell unit including the prepared carbon electrode.

A fuel cell is a continuous-feed electrochemical device in which the chemical energy of the reaction of a conventional fuel and air (oxygen) is converted directly into useful electricity. In the case wehre carbon or a carbonaceous material is oxidized electrochemically with oxygen or air, the system is classified as a direct fuel cell. In the case where a reactant, derived from carbonaceous material with only small energy losses, is oxidized electrochemically, the system is classified as an indirect fuel cell.

The potentialities offered by such batteries are, first, the possibility of constructing electrical power sources with overall efficiencies higher than those obtained from existing devices; second, the possibility of obtaining portable batteries with energy outputs per unit of weight and volume higher than that obtained from chemical batteries presently available; and third, the possibility to design continuously fed batteries in which the cell reactants can be regenerated from the reaction products on a continuous basis, either thermally, radiochemically, or photochemically.

An example of a direct fuel cell that has been investigated is the hydrogen-oxygen cell which oxidizes the fuel hydrogen to water. In such a cell, the electrodes are generally constructed of porous carbon which has been activated (fired in a carbon dioxide atmosphere), platinized, and then wet proofed. The electrolyte used is strongly alkaline, containing potassium hydroxide as the major component. In operation of the cell, hydrogen and oxygen gas are fed through hollow tubes, reaching the active electrode surface by diffusion through the carbon wall. At the hydrogen electrode, hydrogen atoms react with hydroxyl ions to form water, releasing an electron to the external circuit. At the oxygen electrode, oxygen molecules accept electrons from the external circuit to form peroxyl ions. The peroxide is decomposed by catalysts in the electrode, forming water and oxygen, which is reduced to peroxyl ions as rapidly as it is formed.

Though the coulometric efficiency of the above cell is high, this efficiency falls off when an acid electrolyte is used rather than a strongly alkaline electrolyte. The use of an acid electrolyte in a fuel cell is desirable because in the utilization of hydrocarbons or partially oxidized hydrocarbon fuels, a reaction product is carbon dioxide which in turn reacts chemically with the alkaline electrolyte. The problem of creepage and associated difficulties involved in working with strongly alkaline materials are also obviated by the use of an acid electrolyte.

In U.S. patent application Serial No. 199,547 now U.S. Patent No. 3,098,772 the preparation of a high drain carbon electrode for a fuel cell using an acid electrolyte is described. The preparation of the carbon electrode as disclosed in that patent involves the general steps of activation by firing the carbon electrode in a carbon dioxide atmosphere at 800° C., then wet proofing the fired electrode by immersing it in a solution containing a wet proofing agent and finally platinizing the wet proofed electrode by brushing a platinum containing solution thereon.

Though the method of preparing a carbon electrode for use in a fuel cell using an acid electrolyte as described in U.S. Patent No. 3,098,772 is superior to the generally employed method of first activating, then platinizing, and finally wet proofing the carbon electrode, the No. 3,098,772 method still has certain disadvantages. That is, the wet proofing by immersion and platinizing steps result in a generally non-uniform thickness of platinum appearing on the face of the electrode. This cuts down on the number of reactive sites available for the requisite chemical reactions of the fuel cell. It further hinders internal absorption of the wet proofing agent and platinum into the porous carbon electrode.

An object of this invention is to overcome the aforementioned difficulty. A further object of this invention is to provide a method of preparing a carbon electrode for use in a fuel cell using an acid electrolyte wherein a generally uniform thickness of platinum appears on the face of the electrode. Another object of this invention is to provide a method of preparing a carbon electrode for use in a fuel cell using an acid electrolyte wherein a maximum number of reactive sites are available for the requisite chemical reactions of the fuel cell to take place and wherein a maximum amount of wet proofing agent and platinum will be internally absorbed in the carbon electrode. A still further object is to prepare high drain fuel and oxygen electrodes for a fuel cell using an acid electrolyte.

It has now been found that the above objectives can be attained and a fuel cell unit made such as the hydrogen-oxygen cell above mentioned that will perform well when using an acid electrolyte. This result is brought about by preparing the carbon electrodes to be used in the fuel cell in a special manner. Briefly, the preferred method of preparing the carbon electrodes involves the steps of activation by firing the carbon electrode in a carbon dioxide-air atmosphere, wet proofing one face of the fired electrode by electrodeposition, and then platinizing the other face of the fired electrode by electrodeposition.

Particularly, in the initial firing step, each electrode is fired in a partial carbon dioxide-air atmosphere at 1600° F. for one-half hour. The electrode is then cooled in a stream of carbon dioxide gas.

In the wet proofing step, a solution for electrodeposition is first prepared using 1 ml. of polytetrafluoroethylene (Teflon) in every 25 ml. of water. This solution is then made alkaline to a pH of at least 10 and then placed in the electrodeposition bath. A strip of platinum is used as the counter electrode, specifically as the negative electrode or cathode, while the carbon electrode is used as the positive electrode or anode. The solution in the bath is stirred and Teflon deposited at an electrical voltage of 5 to 7 volts at a current of 50 to 100 milliamperes for 4 to 8 hours. The bulk of the Teflon is deposited on the surface of the carbon electrode facing away from the counter electrode.

In platinizing, a chloroplatinic acid solution containing about 100 mg. of platinum per ml. of solution is first prepared. This solution is then placed in an electrodeposition bath. A strip of platinum serves as the counter electrode and is made the positive electrode or anode. The carbon electrode containing a Teflon deposit on one surface thereof is made the cathode or negative electrode with the surface bearing the Teflon deposit facing the counter electrode. Patinum is deposited at the cathode using a voltage of 5 to 8 volts and a current of 100 to 150 milliamperes for a period under 4 hours.

Figure 2:
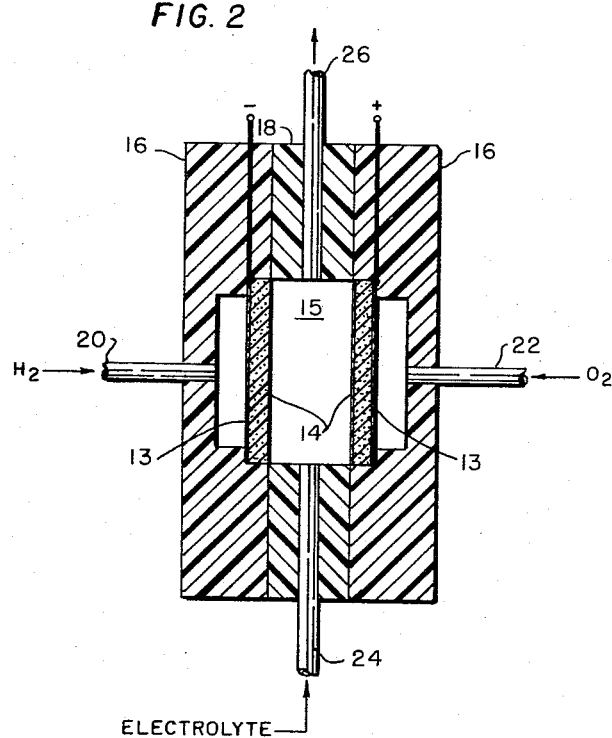

For a better understanding of the invention, together with other and further objects thereof, reference is had to the following description taken in connection with the accompanying drawing in which:

FIG. 1 is a schematic representation of the prepared carbon electrode according to the invention; and FIG. 2 is a schematic diagram of a fuel cell unit using a hydrogen-oxygen system with an acid electrolyte and including the prepared carbon electrode according to the invention.

In FIG. 1 of the drawing, 10 is a carbon electrode prepared according to the preferred method of the invention from a piece of carbon 12, having dimensions of 1.5 inch x 1.5 inch x 0.25 inch. The unprepared carbon 12 has a density of 1.35 gm. per cc., a resistivity of 0.0035 ohms per cubic centimeter, a porosity of 0.331 cc. per gram at a pore diameter of 10 to 0.8 microns, and a surface area of 3.54 square meters per gram. 14 in FIG. 1 is a schematic representation of what is believed to be a generally uniform deposit of finely divided platinum substantially covering one surface of the carbon electrode together with negligible amounts of wet proofing agent. 13 in FIG. 1 is a schematic representation of what is believed to be a generally uniform porous Teflon deposit substantially covering the other surface of the carbon electrode together with negligible amounts of finely divided platinum.

In FIG. 2, the prepared carbon electrodes 10 are placed side by side and separated by the electrolyte chamber 15. In the case of each carbon electrode, the surface 14 bearing the platinum deposit faces chamber 15 while the surface 13 bearing the Teflon deposit faces the fuel and oxidant sources. The electrodes and electrolyte chamber are enclosed in a three compartment housing made of Lucite plastic and having two outer compartments 16, and an intermediate compartment 18. A channel 20 is utilized for introducing fuel in the form of hydrogen gas into the cell through an end face of the reducing electrode 10. Similarly, the channel 22 is utilized for the purpose of introducing oxygen into the cell through an end face of the oxidizing electrode 10. Channel 24 connects with one end of the electrolyte chamber 15 in order to introduce acid electrolyte into the electrolyte chamber. Channel 26 connects to the other end of the electroylte chamber 15 in order to carry a mixture of acid electrolyte and cell reaction products out of the electrolyte chamber.

In operating the cell, three normal sulfuric acid is caused to pass continuously through channel 24 into electrolyte chamber 15. At the same time, hydrogen is caused to pass through channel 20 toward a surface of one of the prepared carbon electrodes 10, and oxygen caused to pass through channel 22 toward a surface of the other prepared carbon electrode 10. The resulting reaction causes a current to flow through the prepared carbon electrodes 10 and an external circuit as indicated by the leads drawn in the figure.

The above cell is characterized by a terminal voltage of 0.901 volts at a current density of 0 milliamperes per square centimeter, a terminal voltage of 0.657 volts at a current density of 10 milliamperes per square centimeter, and a terminal voltage of 0.220 volts at a current density of 50 milliamperes per square centimeter.

When the carbon electrodes for the cell are prepared by the method described in U.S. Patent No. 3,098,772 the following readings are obtained: a terminal voltage of 0.872 volts at a current density of 0 milliamperes per square centimeter, a terminal voltage of 0.470 volts at a current density of 10 milliamperes per square centimeter, and a negative voltage at a current density of 50 milliamperes per square centimeter.

The foregoing description is to be considered merely as illustrative of a preferred embodiment of the invention. Various modifications however, may be made therein.

For example, in the initial firing step in preparing the carbon electrode, various materials that provide an oxidizing atmosphere can be used instead of carbon dioxide. These materials include water vapor and carbon monoxide. The important criteria is that the particular material selected provide an oxidizing atmosphere for controlled oxidation of the carbon.

The particular carbon used for the electrode should be of rigid structure. Any of the variously marketed baked carbons are to be considered as operable when prepared according to the method of the invention.

The fuel cell unit in which the prepared carbon electrode is used is operated with an acid electrolyte that provides a high concentration of $H^+$ ions. Thus, the use of inorganic acids such as phosphoric, hydrochloric, hydrofluoric, hydrobromic, sulfuric, etc., are suitable for use in the invention.

The housing of the fuel cell unit should be inert to acid electrolyte. Thus certain metals and coated metals having this property could be used as the housing for the fuel cell. The fuel cell unit is preferably operated at room temperature although it can be operated at about 10° C. to 60° C.; the upper limit of the temperature range being limited by the melting point of the film from the wet proofing material used in preparing the carbon electrode.

What is claimed is:

1. The method of preparing a carbon electrode for use in a fuel cell using an acid electrolyte, said method comprising firing the carbon electrode in a carbon dioxide-air atmosphere, electrodepositing polytetrafluoroethylene onto one side of the carbon electrode to form a deposit consisting essentially of polytetrafluoroethylene and electrodepositing platinum onto the other side of the carbon electrode to form a deposit consisting essentially of platinum.

2. The method of preparing a carbon electrode for use in a fuel cell using an acid electrolyte, said method comprising firing the carbon electrode in a partial carbon dioxide-air atmosphere at 1600° F. for one-half hour, cooling the fired electrode in a stream of carbon dioxide gas, electrodepositing polytetrafluoroethylene onto one surface of the carbon electrode from a strongly alkaline bath containing polytetrafluoroethylene in solution while making the carbon electrode the positive electrode and a strip of platinum the negative electrode, and electrodepositing platinum onto the other surface of the carbon electrode from a both containing a platinizing solution while making the carbon electrode the negative electrode and a strip of platinum the positive electrode.

3. A prepared carbon electrode suited for use in a fuel cell using an acid electrolyte, said carbon electrode being prepared by the method comprising firing the carbon electrode in a carbon dioxide-air atmosphere, electrodepositing polytetrafluoroethylene onto one side of the carbon electrode to form a deposit consisting essentially of polytetrafluoroethylene and electrodepositing platinum onto the other side of the carbon electrode to form a deposit consisting essentially of platinum.

4. A prepared carbon electrode suited for use in a fuel cell using an acid electrolyte, said carbon electrode being prepared by the method comprising firing the carbon electrode in a partial carbon dioxide-air atmosphere at 1600° F. for one-half hour, cooling the fired electrode in a stream of carbon dioxide gas, electrodepositing polytetrafluoroethylene onto one side of the carbon electrode from a strongly alkaline bath containing polytetrafluoroethylene in solution to form a deposit consisting essentially of polytetrafluoroethylene while making the carbon electrode the positive electrode and a strip of platinum the negative electrode, and electrodepositing platinum onto the other side of the carbon electrode from a bath containing a platinizing solution to form a deposit consisting essentially of platinum while making the carbon electrode the negative electrode and a strip of platinum the positive electrode.

5. A fuel cell unit using an acid electrolyte, said fuel cell unit comprising an oxidizing electrode of prepared carbon and means for passing an oxidizing gas to an end face of said oxidizing electrode, a reducing electrode of prepared carbon and means for passing a fuel gas to an end face of said reducing electrode, an electrolyte chamber for acid electrolyte disposed between the oxidizing and reducing electrode, means for passing the acid electrolyte into one end of said electrolyte chamber, means for passing a mixture of acid electrolyte and cell reaction products out of the other end of said electrolyte chamber, and where said electrodes are prepared prior to use in the fuel cell by the method comprising firing the carbon electrode in a carbon dioxide-air atmosphere, electrodepositing polytetrafluoroethylene onto one side of the carbon electrode to form a deposit consisting essentially of polytetrafluoroethylene and electrodepositing platinum onto the other side of the carbon electrode to form a deposit consisting essentially of platinum.

References Cited by the Examiner
UNITED STATES PATENTS

| | | | |
|---|---|---|---|
| 3,098,762 | 7/1963 | Roblee et al. | 136—86 X |
| 3,231,428 | 1/1966 | Thompson | 136—86 |

WINSTON A. DOUGLAS, *Primary Examiner.*

ALLEN B. CURTIS, *Examiner.*